US010427024B1

United States Patent
Barrett

(10) Patent No.: US 10,427,024 B1
(45) Date of Patent: Oct. 1, 2019

(54) MECHANICALLY PROPELLED SNOWBOARD

(71) Applicant: Andrew Barrett, Mission Viejo, CA (US)

(72) Inventor: Andrew Barrett, Mission Viejo, CA (US)

( * ) Notice: Subject to any disclaimer, the term of this patent is extended or adjusted under 35 U.S.C. 154(b) by 0 days.

(21) Appl. No.: 16/150,367

(22) Filed: Oct. 3, 2018

(51) Int. Cl.
*A63C 5/035* (2006.01)
*B62D 55/08* (2006.01)
*A63C 5/08* (2006.01)
*A63C 5/03* (2006.01)

(52) U.S. Cl.
CPC ............. *A63C 5/085* (2013.01); *A63C 5/03* (2013.01); *A63C 5/035* (2013.01); *B62D 55/08* (2013.01)

(58) Field of Classification Search
CPC .. A63C 5/085; A63C 5/08; A63C 5/03; A63C 5/035; B62D 55/08; A63H 30/00; A63H 30/02; A63H 30/04; A63H 30/06
USPC ........................................................ 180/181
See application file for complete search history.

(56) References Cited

U.S. PATENT DOCUMENTS

| | | | |
|---|---|---|---|
| 3,966,010 A * | 6/1976 | Shiber | A63C 5/085 180/181 |
| 5,662,186 A | 9/1997 | Welch | |
| 6,698,540 B1 | 3/2004 | Decker | |
| 6,725,959 B1 | 4/2004 | Shea | |
| 6,893,320 B2 * | 5/2005 | Caiozza | A63H 30/04 446/454 |
| D567,712 S | 4/2008 | Brazier | |
| 7,434,644 B2 * | 10/2008 | Wier | A63C 5/03 180/172 |
| 7,686,109 B2 | 3/2010 | Brazier | |
| 8,091,671 B1 | 1/2012 | Horsey | |
| 8,596,399 B1 * | 12/2013 | Gauld | A63C 5/08 180/181 |
| 8,991,541 B1 * | 3/2015 | Maier | A63C 5/08 180/181 |
| 2004/0154849 A1 | 8/2004 | Fodor | |

* cited by examiner

*Primary Examiner* — John D Walters

(57) ABSTRACT

A mechanically propelled snowboard for recreational enjoyment includes a board and a propulsion assembly. A pair of bindings that is coupled to the upper face of the board is configured to couple to feet of a user. The propulsion assembly is coupled to a frame that is coupled to the board and extends from an upper face proximate to a tail section of the board. The propulsion assembly comprises an engine, a pair of wheels, one of which is operationally coupled to the engine, and an endless track that is operationally coupled to the pair of wheels. A lower limit of the endless track is substantially coplanar with a lower face of the board. The engine is positioned to rotate the endless track to propel the board along a surface. A controller is operationally coupled to the engine and is positioned to selectively throttle, brake, and shift the engine.

15 Claims, 4 Drawing Sheets

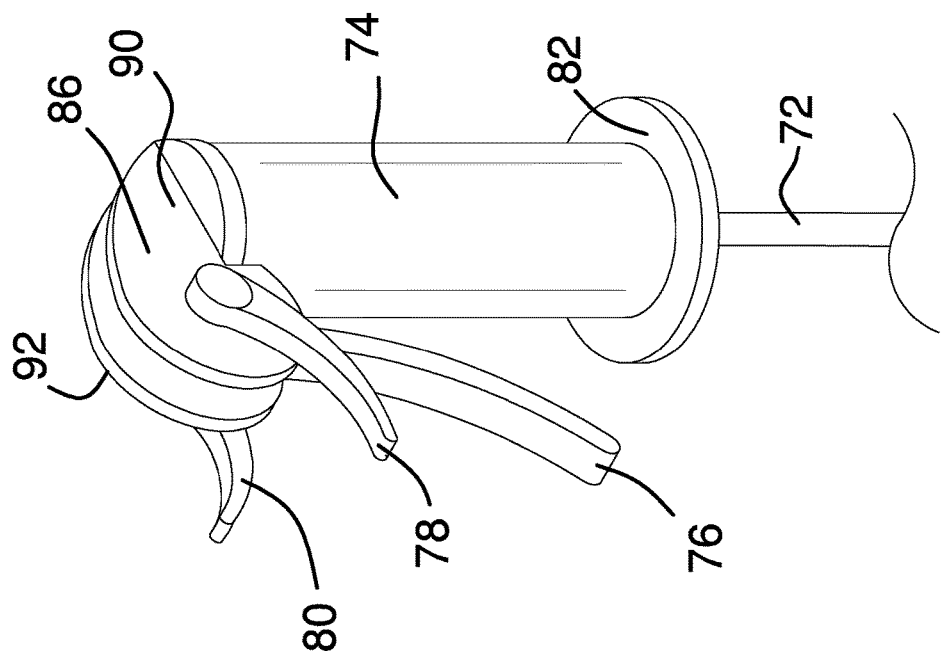
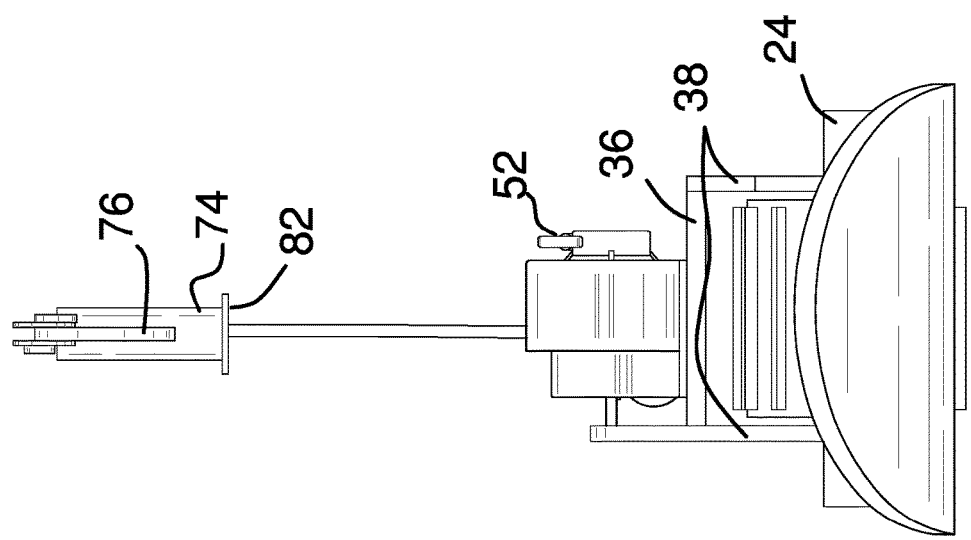

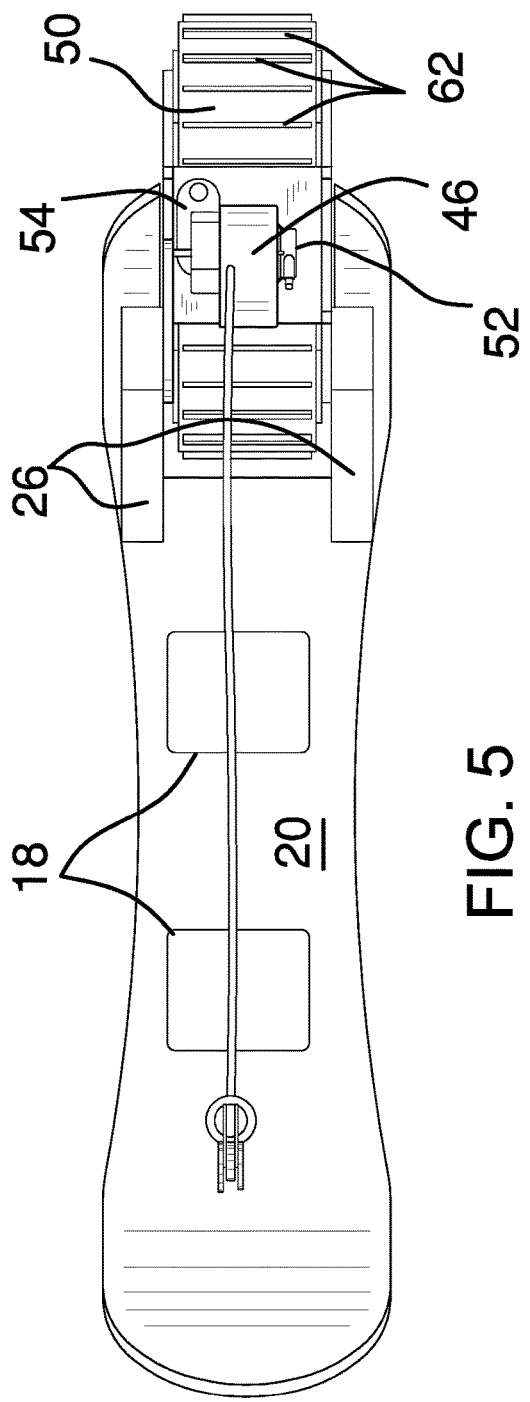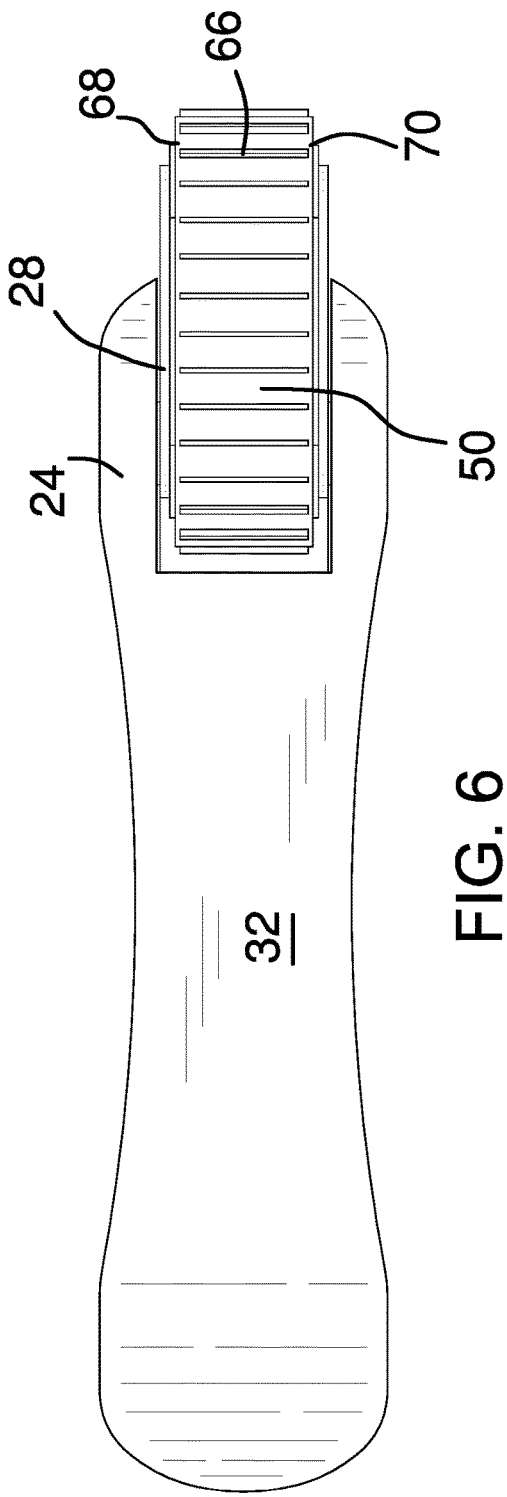

MECHANICALLY PROPELLED SNOWBOARD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to snowboards and more particularly pertains to a new snowboard for recreational enjoyment.

BRIEF SUMMARY OF THE INVENTION

An embodiment of the disclosure meets the needs presented above by generally comprising a board and a propulsion assembly. A pair of bindings that is coupled to the upper face of the board is configured to couple to feet of a user. The propulsion assembly is coupled to a frame that is coupled to the board and extends from an upper face proximate to a tail section of the board. The propulsion assembly comprises an engine, a pair of wheels, one of which is operationally coupled to the engine, and an endless track that is operationally coupled to the pair of wheels. A lower limit of the endless track is substantially coplanar with a lower face of the board. The engine is positioned to rotate the endless track to propel the board along a surface. A controller is operationally coupled to the engine and is positioned to selectively throttle, brake, and shift the engine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a detail view of an embodiment of the disclosure.

FIG. 5 is a top view of an embodiment of the disclosure.

FIG. 6 is a bottom view of an embodiment of the disclosure.

DETAILED DESCRIPTION OF THE INVENTION

Figure 1:
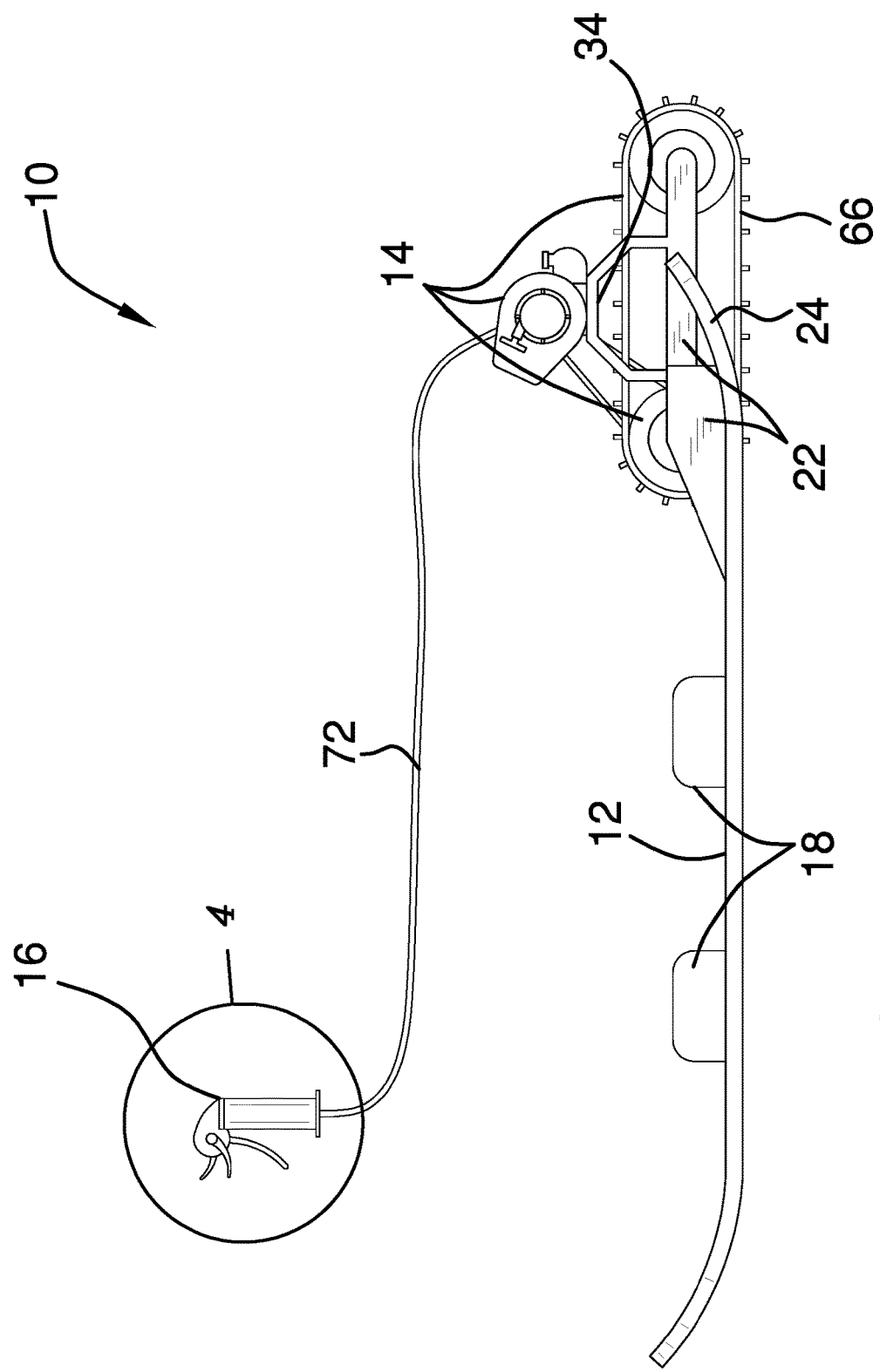
FIG. 1 is a side view of a mechanically propelled snowboard according to an embodiment of the disclosure.

With reference now to the drawings, and in particular to FIGS. 1 through 6 thereof, a new snowboard embodying the principles and concepts of an embodiment of the disclosure and generally designated by the reference numeral 10 will be described.

As best illustrated in FIGS. 1 through 6, the mechanically propelled snowboard 10 generally comprises a board 12, a propulsion assembly 14, and a controller 16. A pair of bindings 18 is coupled to an upper face 20 of the board 12, as shown in FIG. 5. Each binding 18 is configured to couple to a respective foot of a user to couple the user to the board 12.

A frame 22 is coupled to the board 12 and extends from the upper face 20 of the board 12 proximate to a tail section 24 of the board 12. The frame 22 comprises a pair of first plates 26 that is coupled to the board 12 and extends from the upper face 20 of the board 12 proximate to the tail section 24 of the board 12. A slot 28 is positioned in the tail section 24. Each of a pair of bars 30 is coupled to and extends from a respective first plate 26 through the slot 28 so that the bar 30 is substantially parallel to a lower face 32 of the board 12.

An engine mount 34 is coupled to and extends between the bars 30. The engine mount 34 comprises a second plate 36 that is positioned above the pair of bars 30. Each of a set of four rods 38 is coupled to and extends from a respective corner 40 of the second plate 36 to an associated bar 30. Each rod 38 comprises a first section 42 and a second section 44. The first section 42 extends transversely from the second plate 36. The second section 44 is coupled to the first section 42 distal from the second plate 36 and extends to the associated bar 30 so that the second section 44 is perpendicular to the associated bar 30.

The propulsion assembly 14 is coupled to the frame 22. The propulsion assembly 14 comprises an engine 46, a pair of wheels 48, and an endless track 50. The engine 46 is coupled to the engine mount 34. A starter 52, which is recoil type, is coupled to the engine 46 and is positioned to actuate the engine 46. A tank 54 is operationally coupled to the engine 46 and is configured to position fuel for the engine 46.

Figure 2:
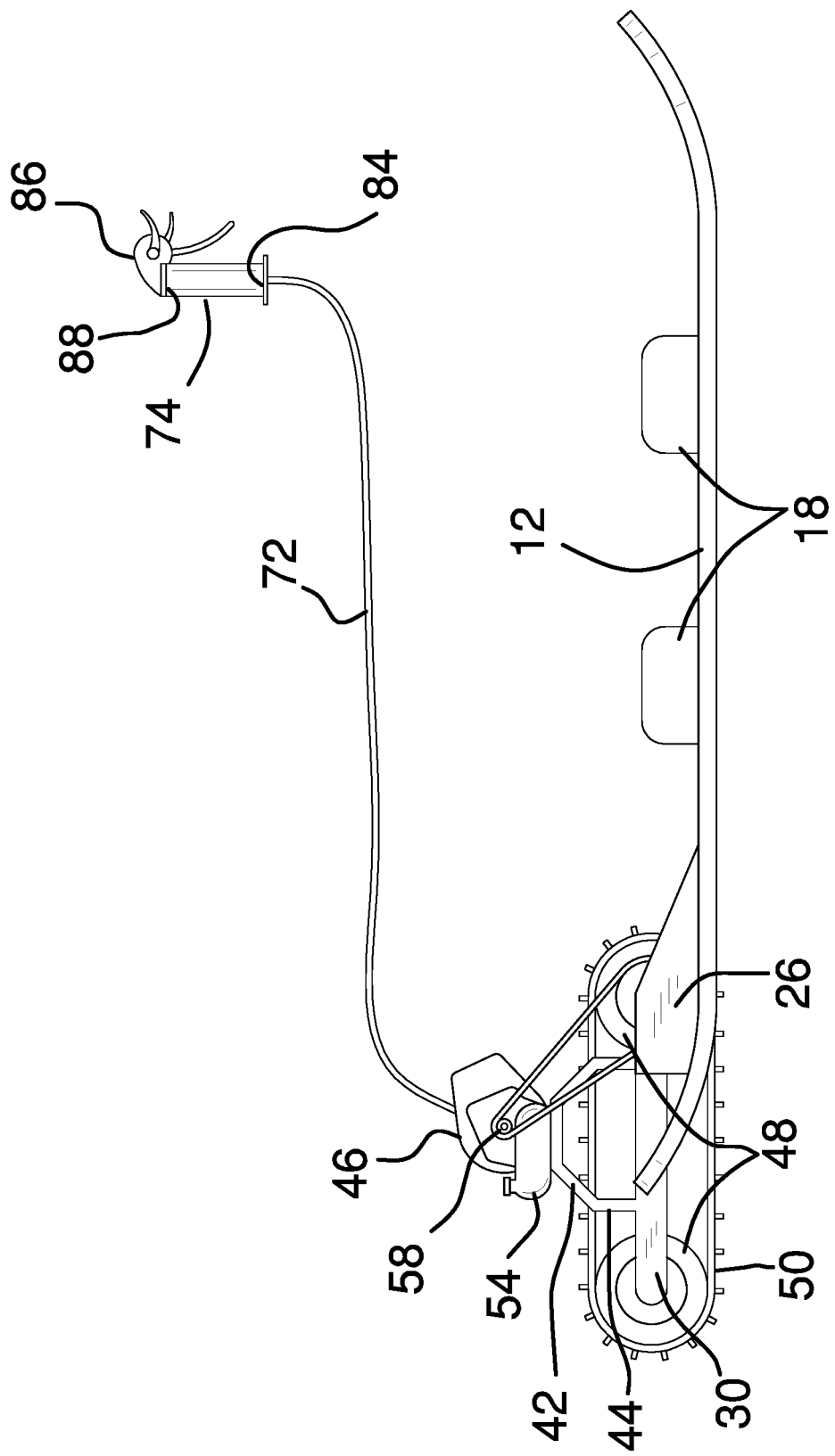
FIG. 2 is a side view of an embodiment of the disclosure.

A respective wheel 48 is operationally coupled to the engine 46 by a belt 56, as shown in FIG. 2. The belt 56 is positioned to transfer torque from a shaft 58 of the engine 46 to the respective wheel 48. Each wheel 48 is axially coupled to and extends between the pair of bars 30. The endless track 50 is operationally coupled to the pair of wheels 48 so that a lower limit 60 of the endless track 50 is substantially coplanar with the lower face 32 of the board 12. The engine 46 is positioned to selectively rotate the endless track 50, concurrently with the respective wheel 48, to propel the board 12 and the user along a surface, such as snow.

A plurality of extrusions 62 is coupled to and extends from an outer surface 64 of the endless track 50, as shown in FIG. 6. The extrusions 62 are configured to provide traction to the endless track 50. Each extrusion 62 comprises a rib 66 that extends from proximate to a first edge 68 to proximate to a second edge 70 of the endless track 50.

The controller 16 is operationally coupled to the engine 46 and is positioned to selectively throttle, brake, and shift the engine 46. The controller 16 is wiredly coupled to the engine 46, as shown in FIG. 1. The controller 16 comprises a cable 72, a grip 74, a first lever 76, a second lever 78, and a third lever 80. The cable 72 is operationally coupled to and extends from the engine 46.

The grip 74, which is cylindrically shaped, is coupled to the cable 72 distal from the engine 46. The grip 74 is configured to be grasped in a hand of the user who is positioned on the board 12. A disc 82 is coupled to and extends radially from a bottom 84 of the grip 74. The disc 82 is configured to deter slippage of the hand that is grasping the grip 74.

A protrusion 86 is coupled to and extends transversely from a top 88 of the grip 74. The first lever 76 is pivotally coupled to the protrusion 86 and extends proximate to the grip 74 toward the cable 72. The first lever 76 is configured to position digits of the hand of the user so that the user is positioned to pivot the first lever 76 toward the grip 74 to throttle up the engine 46 and to release the first lever 76 to throttle down the engine 46.

The second lever 78 pivotally is coupled to a first side 90 of the protrusion 86. The second lever 78 is configured to position a digit of the hand of the user so that the user is positioned to pivot the second lever 78 toward the grip 74 to brake the engine 46. The third lever 80 is pivotally coupled to a second side 92 of the protrusion 86. The third lever 80 is configured to position a digit of the hand of the user so that the user is positioned to pivot the third lever 80 toward the grip 74 to upshift the engine 46 and to pivot the third lever 80 distal to the grip 74 to downshift the engine 46.

In use, the user actuates the engine 46 using the starter 52 and then couples the board 12 to his feet using the bindings 18. The controller 16 then is used to selectively throttle up the engine 46 to propel the board 12 and the user along a surface. As required, the controller 16 is used to brake and to shift the engine 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

The invention claimed is:

1. A mechanically propelled snowboard comprising:
   a board;
   a frame coupled to the board and extending from an upper face of the board proximate to a tail section of the board;
   a pair of bindings coupled to the upper face of the board wherein each binding is configured for coupling to a respective foot of a user for coupling the user to the board;
   a propulsion assembly coupled to the frame, the propulsion assembly comprising:
      an engine,
      a pair of wheels, a respective wheel being operationally coupled to the engine, and
      an endless track operationally coupled to the pair of wheels such that a lower limit of the endless track is substantially coplanar with a lower face of the board wherein the engine is positioned for selectively rotating the endless track concurrently with the respective wheel for propelling the board and the user along a surface;
   a controller operationally coupled to the engine wherein the controller is positioned for selectively throttling, braking, and shifting the engine; and
   the frame comprising
      a pair of first plates coupled to the board and extending from the upper face of the board proximate to the tail section of the board;
      a slot positioned in the tail section;
      a pair of bars, each bar being coupled to and extending from a respective first plate through the slot such that the bar is substantially parallel to the lower face of the board; and
      an engine mount coupled to and extending between the bars.

2. The snowboard of claim 1, further including the engine being coupled to the engine mount.

3. The snowboard of claim 1, further including the engine mount comprising:
   a second plate positioned above the pair of bars; and
   a set of four rods, each rod being coupled to and extending from a respective corner of the second plate to an associated bar, each rod comprising a first section and a second section, the first section extending transversely from the second plate, the second section being coupled to the first section distal from the second plate and extending to the associated bar such that the second section is perpendicular to the associated bar.

4. The snowboard of claim 1, further including a starter coupled to the engine wherein the starter is positioned for actuating the engine.

5. The snowboard of claim 4, further including the starter being recoil type.

6. The snowboard of claim 1, further including a tank operationally coupled to the engine wherein the tank is configured for positioning fuel for the engine.

7. The snowboard of claim 1, further including each wheel being axially coupled to and extending between the pair of bars.

8. The snowboard of claim 1, further including a belt operationally coupled to the engine and the respective wheel wherein the belt is positioned for transferring torque from a shaft of the engine to the respective wheel.

9. The snowboard of claim 1, further including a plurality of extrusions coupled to and extending from an outer surface of the endless track wherein the extrusions are configured for providing traction to the endless track.

10. The snowboard of claim 9, further including each extrusion comprising a rib extending from proximate to a first edge to proximate to a second edge of the endless track.

11. The snowboard of claim 1, further including the controller being wiredly coupled to the engine.

12. A mechanically propelled snowboard comprising:
a board;
a frame coupled to the board and extending from an upper face of the board proximate to a tail section of the board;
a pair of bindings coupled to the upper face of the board wherein each binding is configured for coupling to a respective foot of a user for coupling the user to the board;
a propulsion assembly coupled to the frame, the propulsion assembly comprising:
an engine,
a pair of wheels, a respective wheel being operationally coupled to the engine, and
an endless track operationally coupled to the pair of wheels such that a lower limit of the endless track is substantially coplanar with a lower face of the board wherein the engine is positioned for selectively rotating the endless track concurrently with the respective wheel for propelling the board and the user along a surface; and
a controller operationally coupled to the engine wherein the controller is positioned for selectively throttling, braking, and shifting the engine, the controller being wiredly coupled to the engine, the controller comprising
a cable operationally coupled to and extending from the engine;
a grip coupled to the cable distal from the engine wherein the grip is configured for grasping in a hand of the user positioned on the board;
a protrusion coupled to and extending transversely from a top of the grip;
a first lever pivotally coupled to the protrusion and extending proximate to the grip toward the cable wherein the first lever is configured for positioning digits of the hand of the user positioning the user for pivoting the first lever toward the grip for throttling up the engine and for releasing the first lever for throttling down the engine;
a second lever pivotally coupled to a first side of the protrusion wherein the second lever is configured for positioning a digit of the hand of the user positioning the user for pivoting the second lever toward the grip for braking the engine; and
a third lever pivotally coupled to a second side of the protrusion wherein the third lever is configured for positioning a digit of the hand of the user positioning the user for pivoting the third lever toward the grip for upshifting the engine and for pivoting the third lever distal to the grip for downshifting the engine.

13. The snowboard of claim 12, further including the grip being cylindrically shaped.

14. The snowboard of claim 13, further including a disc coupled to and extending radially from a bottom of the grip wherein the disc is configured for deterring slippage of the hand grasping the grip.

15. A mechanically propelled snowboard comprising:
a board;
a frame coupled to the board and extending from an upper face of the board proximate to a tail section of the board, the frame comprising:
a pair of first plates coupled to the board and extending from the upper face of the board proximate to the tail section of the board,
a slot positioned in the tail section,
a pair of bars, each bar being coupled to and extending from a respective first plate through the slot such that the bar is substantially parallel to a lower face of the board, and
an engine mount coupled to and extending between the bars, the engine mount comprising:
a second plate positioned above the pair of bars, and
a set of four rods, each rod being coupled to and extending from a respective corner of the second plate to an associated bar, each rod comprising a first section and a second section, the first section extending transversely from the second plate, the second section being coupled to the first section distal from the second plate and extending to the associated bar such that the second section is perpendicular to the associated bar;
a pair of bindings coupled to the upper face of the board wherein each binding is configured for coupling to a respective foot of a user for coupling the user to the board;
a propulsion assembly coupled to the frame, the propulsion assembly comprising:
an engine, the engine being coupled to the engine mount,
a starter coupled to the engine wherein the starter is positioned for actuating the engine, the starter being recoil type,
a tank operationally coupled to the engine wherein the tank is configured for positioning fuel for the engine,
a pair of wheels, a respective wheel being operationally coupled to the engine, each wheel being axially coupled to and extending between the pair of bars,
a belt operationally coupled to the engine and the respective wheel wherein the belt is positioned for transferring torque from a shaft of the engine to the respective wheel,
an endless track operationally coupled to the pair of wheels such that a lower limit of the endless track is substantially coplanar with the lower face of the board wherein the engine is positioned for selectively rotating the endless track concurrently with the respective wheel for propelling the board and the user along a surface, and
a plurality of extrusions coupled to and extending from an outer surface of the endless track wherein the extrusions are configured for providing traction to the endless track, each extrusion comprising a rib extending from proximate to a first edge to proximate to a second edge of the endless track; and a controller operationally coupled to the engine wherein the controller is positioned for selectively throttling, braking, and shifting the engine, the controller being wiredly coupled to the engine, the controller comprising:
- a cable operationally coupled to and extending from the engine,
- a grip coupled to the cable distal from the engine wherein the grip is configured for grasping in a hand of the user positioned on the board, the grip being cylindrically shaped,
- a disc coupled to and extending radially from a bottom of the grip wherein the disc is configured for deterring slippage of the hand grasping the grip,
- a protrusion coupled to and extending transversely from a top of the grip,
- a first lever pivotally coupled to the protrusion and extending proximate to the grip toward the cable wherein the first lever is configured for positioning digits of the hand of the user positioning the user for pivoting the first lever toward the grip for throttling up the engine and for releasing the first lever for throttling down the engine,
- a second lever pivotally coupled to a first side of the protrusion wherein the second lever is configured for positioning a digit of the hand of the user positioning the user for pivoting the second lever toward the grip for braking the engine, and
- a third lever pivotally coupled to a second side of the protrusion wherein the third lever is configured for positioning a digit of the hand of the user positioning the user for pivoting the third lever toward the grip for upshifting the engine and for pivoting the third lever distal to the grip for downshifting the engine.

* * * * *